United States Patent
Chillar et al.

(10) Patent No.: US 7,963,095 B2
(45) Date of Patent: *Jun. 21, 2011

(54) INLET AIR CONDITIONING SYSTEM

(75) Inventors: Rahul J. Chillar, Marietta, GA (US);
David L. Rogers, Marietta, GA (US);
Abbas Motakef, Duluth, GA (US)

(73) Assignee: General Electric Company, Schenectady, NY (US)

(*) Notice: Subject to any disclaimer, the term of this patent is extended or adjusted under 35 U.S.C. 154(b) by 440 days.

This patent is subject to a terminal disclaimer.

(21) Appl. No.: 12/192,584

(22) Filed: Aug. 15, 2008

(65) Prior Publication Data

US 2008/0298957 A1  Dec. 4, 2008

Related U.S. Application Data

(63) Continuation-in-part of application No. 11/425,520, filed on Jun. 21, 2006, now Pat. No. 7,648,564.

(51) Int. Cl.
*B01D 46/00* (2006.01)

(52) U.S. Cl. .......... 60/39.182; 60/39.5; 60/599; 60/772; 60/728; 60/694; 60/248; 60/262; 60/287; 165/100; 165/103

(58) Field of Classification Search ............ 55/309, 55/312, 313, 314, 430, 432, 428, 466, 429; 95/273; 60/39.182, 39.5, 599, 772, 728, 694, 248, 262, 287; 220/745, 810, 811, 913; 137/875; 165/100, 103, DIG. 109
See application file for complete search history.

(56) References Cited

U.S. PATENT DOCUMENTS

| 7,648,564 | B2 * | 1/2010 | Chillar et al. ............... 95/273 |
| 2005/0056023 | A1 | 3/2005 | Pierson | |

FOREIGN PATENT DOCUMENTS

| EP | 1484489 A2 | 12/2004 |
| EP | 1484489 A3 | 10/2007 |

* cited by examiner

*Primary Examiner* — Duane Smith
*Assistant Examiner* — Minh-Chau Pham
(74) *Attorney, Agent, or Firm* — Dale J. Davis; Ernst G. Cusick; Frank A. Landgraff

(57) ABSTRACT

An embodiment of the present invention provides an air conditioning system located upstream of the inlet system for a gas turbine. The air conditioning system may include at least one conditioning module for adjusting the temperature of the airstream. The at least one conditioning module may have a plurality of forms including at least one of the following systems: a chiller, an evaporative cooler; a spray cooler, or combinations thereof. The specific form of the at least one conditioning module may be determined in part the configuration of the gas turbine.

20 Claims, 4 Drawing Sheets

INLET AIR CONDITIONING SYSTEM

This application is a continuation-in-part of commonly assigned U.S. patent application Ser. No. 11/425,520, filed Jun. 21, 2006, now U.S. Pat. No. 7,648,564, B2.

BACKGROUND OF THE INVENTION

The present invention relates generally to a turbomachine; and more particularly to a system for increasing the efficiency of a turbomachine.

Some turbomachines, such as, but not limiting of, a gas turbine, may generally include, in serial flow arrangement, an inlet system for receiving and channeling an ambient airstream; a compressor which receives and compresses that airstream, a combusting system that mixes a fuel and the compressed airstream, ignites the mixture, and allows for the gaseous by-product to flow to a turbine section; which transfers energy from the gaseous by-product to an output power. Other components of the gas turbine may be used therein.

The power output of a gas turbine is directly proportional to, and limited by, the mass flowrate of compressed airstream exiting the compressor. The compressor has a fixed capacity for handling a volumetric flowrate of the airstream for a given rotational speed of the compressor. The mass flowrate of the airstream decreases with an increase in ambient temperature because the density of the air decreases when air temperature increases. Therefore, the efficiency and power output of the gas turbine decreases below the rated capacity at the ISO conditions with increases in ambient temperature above ISO conditions.

To generate additional power from an existing gas turbine, an inlet air conditioning system is commonly used. The air conditioning system increases the airstream density by lowering the temperature of the airstream. This increases the mass flowrate of air entering the compressor, resulting in increased efficiency and power output of the gas turbine. An air conditioning system may include, for example, but not limiting of, a chiller, an evaporative cooler, a spray cooler, or combinations thereof, located downstream of an inlet filter house within an inlet system of the gas turbine. Some air conditioning systems, however, add resistance to the airstream entering the compressor. This resistance is defined as a pressure drop in the inlet system and may be measured in inches of water column. Gas turbine efficiency and power output are a direct function of the inlet system pressure drop.

The higher the inlet system pressure drop, the lower the efficiency and power output of the turbine. Typical pressure drop values across the gas turbine inlet system for power generation varies from about two (2) to about five (5) inches of water column (about five to about 12.7 centimeters of water). This includes the pressure drop across the air conditioning system, which varies from about 0.5 inches to about 1.5 inches of water column (about 1.27 to about 3.8 centimeters of water). Depending on the size of the gas turbine frame, the value of this pressure drop affects the gas turbine output anywhere in the range of about one (1) to about five (5) megawatts at rated ISO conditions. This in turn may affect the turbine efficiency in the range of about 0.01% to about 0.3%. Every point of efficiency and power, however, is essential in the competitive business of power generation or the variety of other uses for mechanical drive gas turbines.

Operators of existing gas turbines, (that do not have an air conditioning system), may desire the additional power output and efficiency increases these systems provide. However, these operators may resist retrofitting the gas turbine for a few reasons including operational downtime and construction costs. Gas turbine operators greatly avoid shutting down the machines because of the associated loss in revenue. Also, the cost of retrofitting an inlet system can be exorbitant.

One retrofitting approach involves inserting the air conditioning system downstream of the inlet filter house. This approach requires extensive retrofitting, which involves separating the inlet filter house from the transition piece. Next, the inlet filter house is moved forward such that the air conditioning system is inserted between the transition piece and the inlet filter house. Another retrofitting approach involves replacing the existing inlet filter house with a new inlet filter house having an air conditioning system therein. The downtime, lost revenues, and construction costs prohibit operators from adding an air conditioning system.

For the foregoing reasons, there is a need for an air conditioning system for retrofitting an operating gas turbine. After installing, the system should reduce the inlet system pressure drop when not in operation. The system components should be installed without a need for extending the overall inlet system. The system should be capable of being installed with minimum disruption to gas turbine operation.

BRIEF DESCRIPTION OF THE INVENTION

In an embodiment of the present invention, a system for increasing the efficiency of a turbomachine comprising an inlet system and a compressor, the system comprising: a housing configured to channel an airstream towards the inlet system; wherein the housing is positioned upstream of the inlet system; and at least one conditioning module configured for adjusting the temperature of the airstream; wherein the airstream enters the conditioning module at a first temperature and exits the conditioning module at a second temperature.

In an alternate embodiment of the present invention, a system for adjusting a temperature of an airstream, the system comprising: an inlet system comprising: an inlet filter house, a transition piece, and an inlet duct; and an air conditioning system comprising: a housing configured to channel an airstream towards the inlet system; wherein the housing is positioned upstream of the inlet system; and at least one conditioning module configured for adjusting the temperature of the airstream; wherein the at least one conditioning module comprises at least one of the following system: a chiller, an evaporative cooler; a spray cooler, or combinations thereof; wherein the airstream enters the conditioning module at a first temperature and exits the conditioning module at a second temperature.

BRIEF DESCRIPTION OF THE DRAWINGS

These and other features, aspects, and advantages of the present invention will become better understood when the following detailed description is read with reference to the accompanying drawings in which like characters represent like elements throughout the drawings.

FIG. 3, are schematics illustrating an air conditioning system in accordance with an alternate embodiment of the present invention.

DETAILED DESCRIPTION OF THE INVENTION

The following detailed description, of preferred embodiments, refers to the accompanying drawings, which illustrate specific embodiments of the invention. Other embodiments having different structures and operations do not depart from the scope of the present invention.

Certain terminology may be used herein for the convenience of the reader only and is not to be taken as a limitation on the scope of the invention. For example, words such as "upper", "lower", "left", "right", "front", "rear", "top", "bottom", "horizontal", "vertical", "tipstream", "downstream", "fore", "aft", and the like; merely describe the configuration shown in the Figures. Indeed, the element or elements of an embodiment of the present invention may be oriented in any direction and the terminology, therefore, should be understood as encompassing such variations unless specified otherwise.

The present invention provides an air conditioning system located upstream of the inlet system for a gas turbine. The air conditioning system may comprise at least one conditioning module for adjusting the temperature of the airstream. The at least one conditioning module may have a plurality of forms including at least one of the following systems: a chiller, an evaporative cooler; a spray cooler, or combinations thereof. The specific form of the at least one conditioning module may be determined in part the configuration of the gas turbine.

In an embodiment of the present invention, the air conditioning system may decrease the temperature of the airstream entering the inlet system of the gas turbine to increase the efficiency and power output. Alternatively, the air conditioning system may increase the temperature of the airstream entering the inlet system of the gas turbine to reduce the possibly of icing on the compressor blades.

In an alternate embodiment of the present invention, the air conditioning system may be integrated with a bypass. The bypass may reduce the pressure drop derived from a non-operating air conditioning system.

Figure 1:
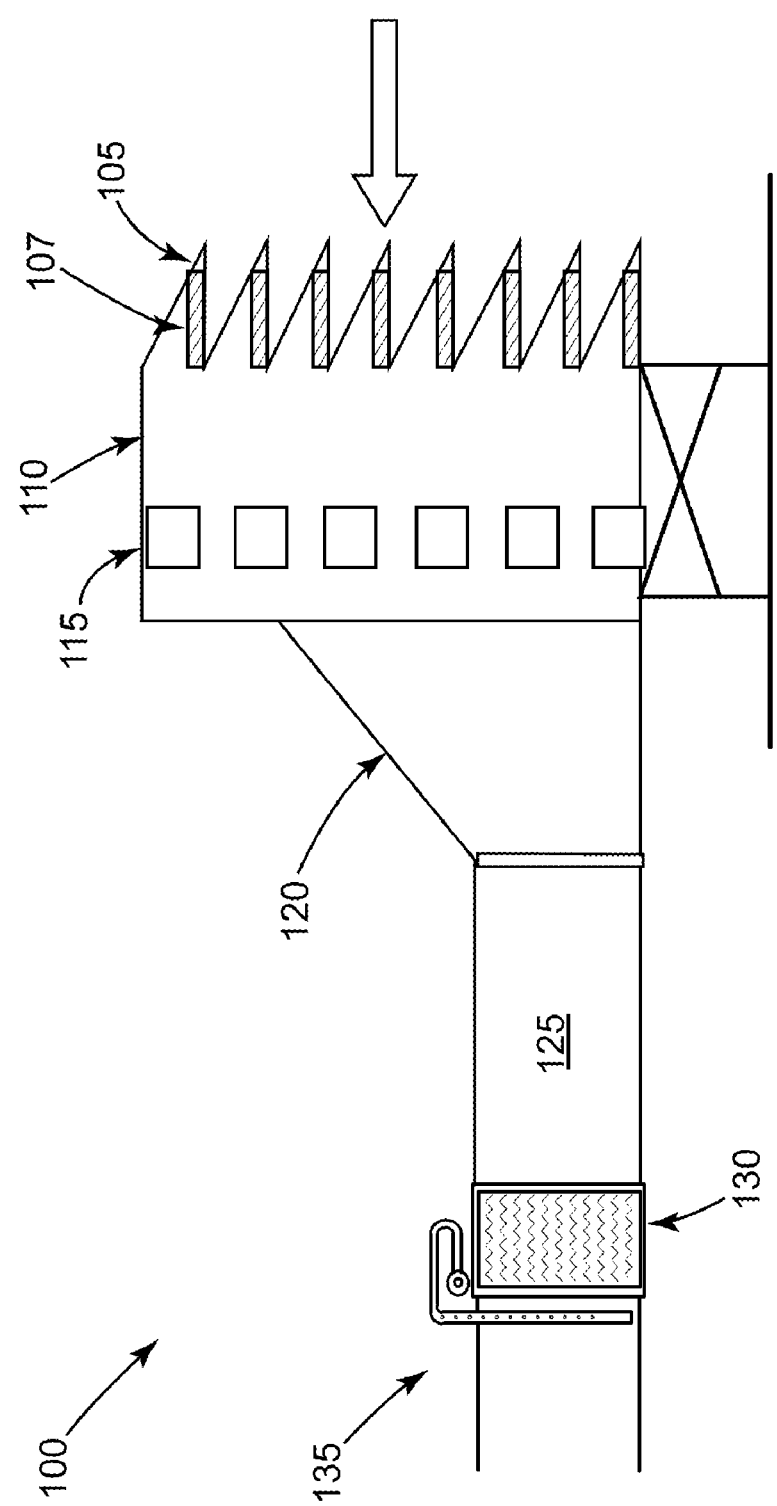
FIG. 1 is a schematic illustrating an environment where an embodiment of the present invention may operate.

Referring now to the Figures, where the various numbers represent like elements throughout the several views. FIG. 1 is a schematic illustrating an environment where an embodiment of the present invention may operate. FIG. 1 illustrates an inlet system 100 that may be integrated with a gas turbine compressor (not illustrated). The following description provides an overview of a typical configuration of an inlet system 100; the present invention may be integrated with other configurations of the inlet system 100, which are not illustrated in the Figures. Furthermore, an embodiment of the present invention may be integrated with inlet systems 100 not associated with gas turbines, or other turbomachines.

The inlet system 100 channels the airstream (represented by the arrow pointed towards the inlet system 100) ingested by the compressor. The airstream may derive directly or indirectly from the environment in which the turbomachine operates. Initially, the airstream flows around a weather hood 105, which may prevent weather elements, such as rain, snow, etc, from entering the compressor. The weather hood 105 may include a plurality of drift eliminator and/or coalescer pads 107, for reducing the content of liquids within the airstream. The airstream may then flow through an inlet filter house 110; which generally removes foreign objects and debris from the airstream. Next, the airstream may pass through an air conditioning system 115. Next, the airstream may pass through a transition piece 120 and an inlet duct 125; these components may adjust the velocity and pressure of the airstream. Next, the airstream may flow through a silencer section 130. Next, the airstream may flow through an inlet bleed heat system 135, which generally increases the temperature of the airstream prior to entering the compressor.

Figure 2:
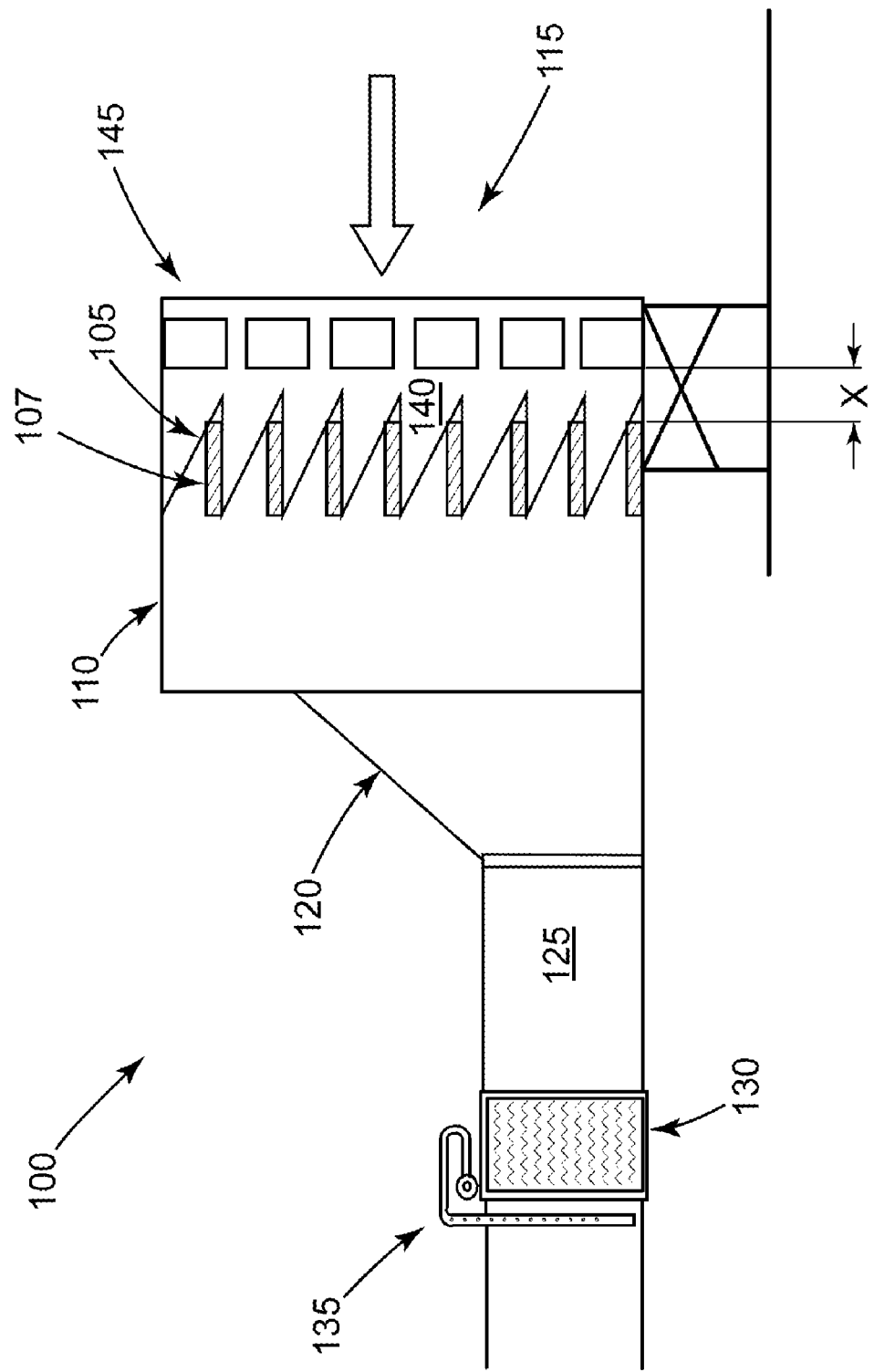
FIG. 2 is a schematic illustrating an air conditioning system in accordance with an embodiment of the present invention.

FIG. 2 is a schematic illustrating an air conditioning system 115 in accordance with an embodiment of the present invention. FIG. 2 illustrates an embodiment of the inlet system 100 and an embodiment of the air conditioning system 115. In this embodiment of the present invention the air conditioning system 115 comprises at least one conditioning module 145 positioned within a housing 140.

Similarly if the operating environment of the turbomachine 200 is caustic in nature, then the deposits on the compressor 205 may be caustic in nature. The inlet filter house 110 may not completely mitigate the effect of these caustic compounds on the compressor 205. An embodiment of the present invention may mix at least one chemical agent with a cleaning fluid, creating a cleaning solution for reducing the amount of corrosive deposits on the compressor 205. Here, the clean solution may be considered mildly acidic. The cleaning solution may react with the basic deposits on the compressor 205; neutralizing, and possibly mitigating the corrosion.

The housing 140 may enclose a portion or all of the components of the at least one conditioning module 145. As illustrated in FIG. 2, the housing 140 may have a shape similar to the inlet filter house 110, or any other shape allowing for structural integration with the inlet system 100. The integration of the inlet filter house 110 and the housing 140 may allow for a nearly uniform flow of the airstream entering the air conditioning system 115 and then flowing to the inlet filter house 110. The housing 140 may be joined to the inlet system 100 via a plurality of connection means, such as, but not limiting of, welding, bolting, other fastening methods, or combinations thereof. The housing 140 may created of any material capable of: supporting the at least one conditioning module 145; and allowing for integration with the inlet system 100. This material may be for example, but not limiting of, a metal, an alloy, or other structural materials.

As illustrated in FIG. 2, the air conditioning system 115 of an embodiment of the present invention may install at an operational distance represented as location "X". The operational distance may allow for access to the at least one conditioning module 145 within the housing 140. The operational distance "X" may aid in maintenance of the at least one conditioning module 145. The operational distance "X" may also prevent fluid droplets and/or condensate from the at least one conditioning module 145 from wetting a portion of the filters within the inlet filter house 110. The operational distance "X" may also reduce the pressure drop when the air conditioning system 115 is not operation. Location X may be from a downstream end of the at least one conditioning module 145 to an upstream end of the weather hood 105. The operational distance may comprise a range of from about 1 meter to about 3 meters.

The at least one conditioning module 145 may have the form of at least one of the following system: a chiller, an evaporative cooler; a spray cooler, or combinations thereof. The at least one conditioning module 145 may also include a pre-filter (not illustrated) upstream of the at least one conditioning module 145 to guard against debris and foreign objects. The at least one conditioning module 145 may be configured for adjusting the temperature of the airstream. The at least one conditioning module 145 may decrease the temperature of the airstream. Here, the gas turbine may be operating during a time when the ambient air is above ISO conditions; reducing the power output and efficiency. The at least one conditioning module 145 may also increase the temperature of the airstream. Here, the gas turbine may be operating during a time when the ambient air conditions may lead to ice formation on the compressor blades.

In use, this first exemplary embodiment of the present invention may be installed with little disruption to the operation of the gas turbine. An operator of the gas turbine may connect the air conditioning system 115 to the front of the inlet system 100. During the installation the airstream may flow around the and/or through the at least one conditioning module 145. Moreover, during the installation the inlet system 100 may not need to be substantially modified to integrate with the air conditioning system 115. After installation, an operator of the gas turbine may experience significant increases in efficiency and output. For example, but not limiting of, on a large Frame 9 type of gas turbine operating with an ambient airstream temperature of about 90 deg. F. and about 50% relative humidity, the air conditioning system 115 may reduce the airstream to about 59 deg. F. This may result in up to a 15% increase power output and up to a 1.0% increase in efficiency.

Figure 3A:
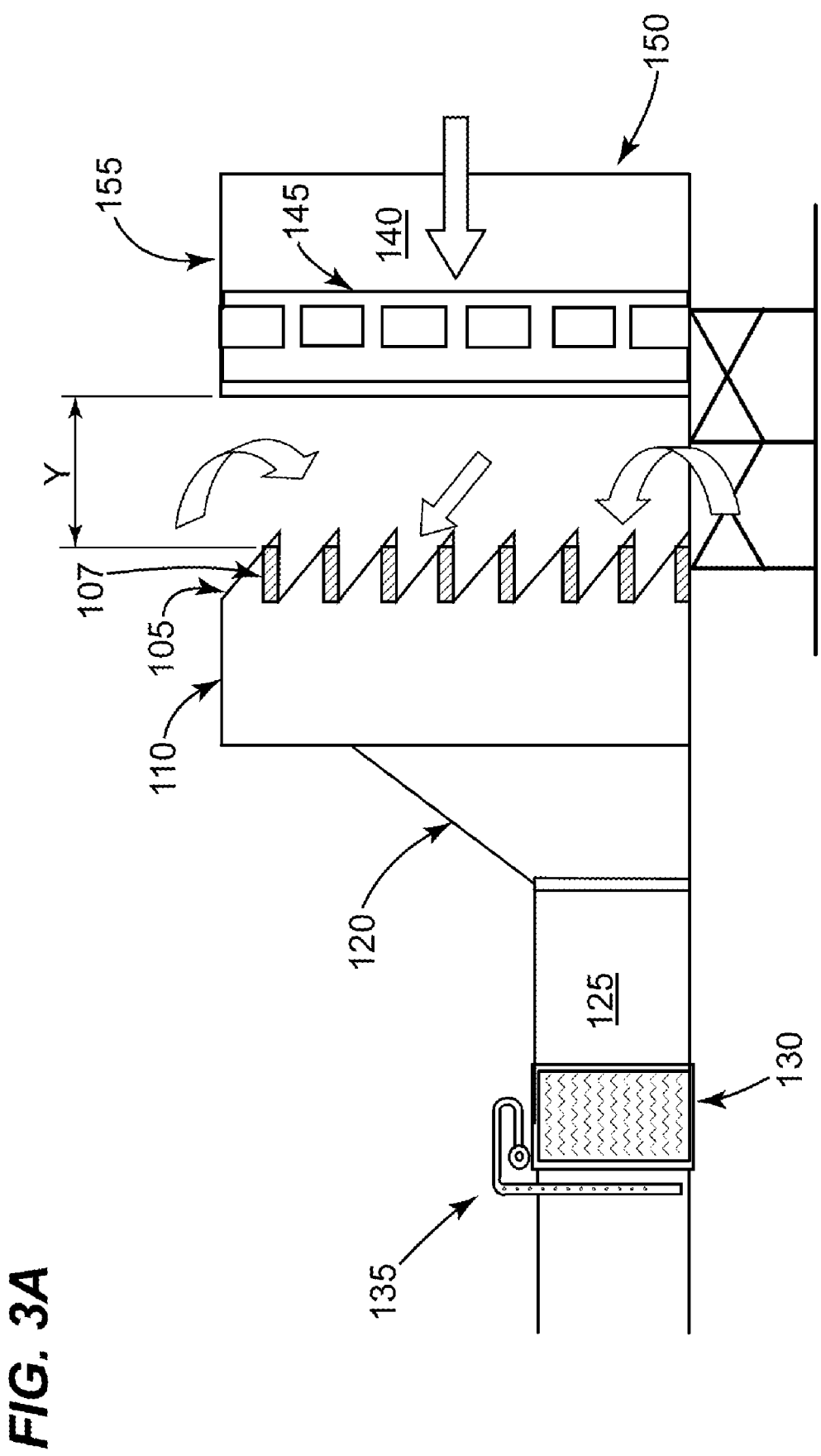
FIGS. 3A and 3B, collectively
Figure 3B:
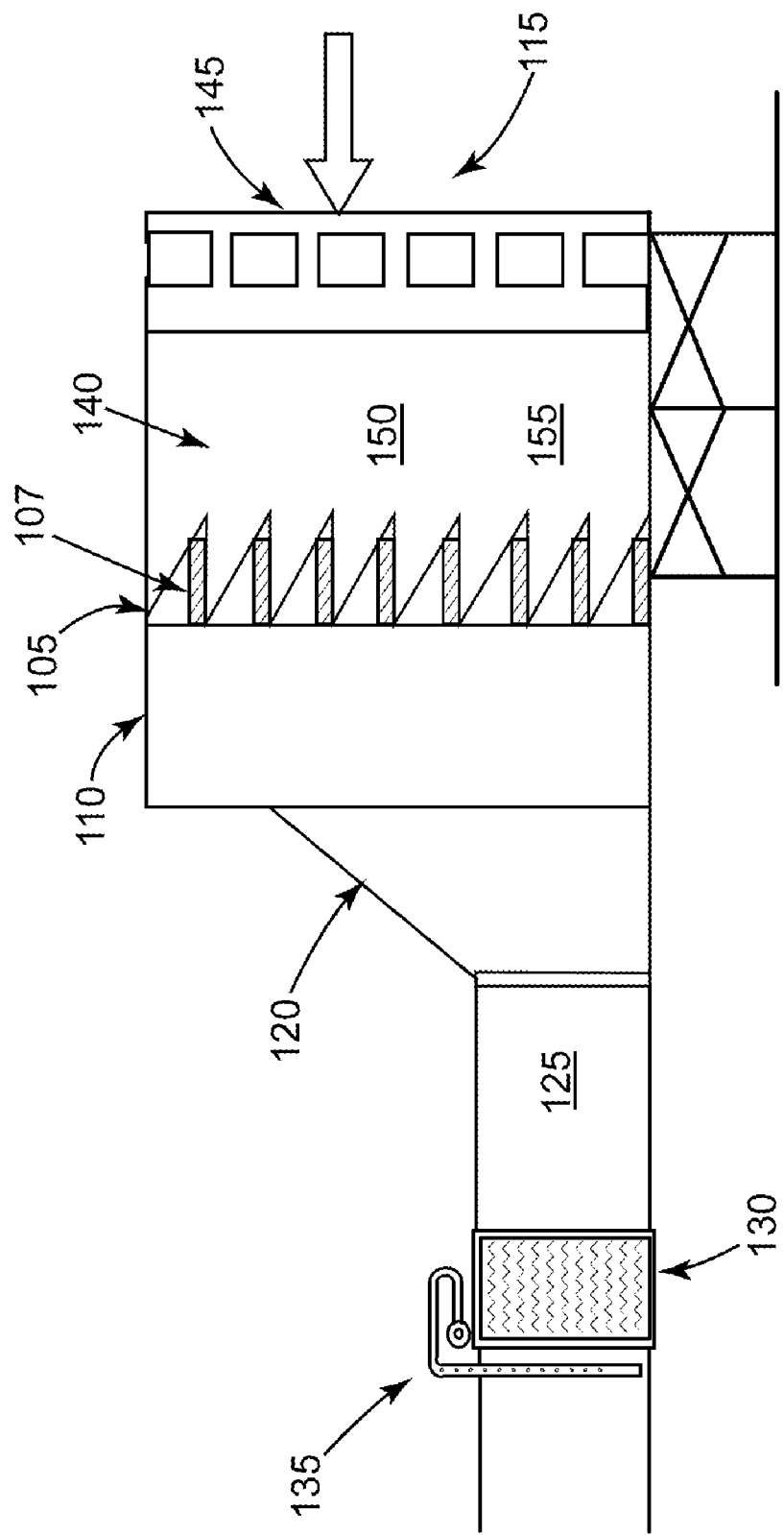

FIGS. 3A and 3B, collectively FIG. 3, are schematics illustrating an air conditioning system 115 in accordance with an alternate embodiment of the present invention. The discussion hereafter will be limited to the differences between this alternate embodiment and the previous embodiment.

FIG. 3 illustrates the air conditioning system 115 integrated with an inlet system 100 having a bypass 150. The bypass 150 may reduce the pressure drop while the air conditioning system 115 is not operating. The bypass 150 may increase the overall efficiency and power of the gas turbine. The bypass 150 may include at least one damper door 155 positioned between the at least one conditioning module 145 and the inlet filter house 110. When the air conditioning system 115 is not operating, the at least one damper door 155 may be opened to allow the airstream to flow directly into the inlet system 100. This may allow for a reduction in pressure drop. The at least one damper door 155 may slide into a desired position. Alternatively, the at least one damper door 155 may be hinged to allow movement into a desired position. The bypass 150 may created out of any material capable of withstanding the operational environments of the inlet system 100 and the air conditioning system 115.

As illustrated in FIG. 3, the air conditioning system 115 of an alternate embodiment of the present invention may install at a bypass distance represented as location "Y". The bypass distance may allow for access to the at least one conditioning module 145 within the housing 140. Location Y may also reduce the pressure drop when the air conditioning system 115 is not operation. Location Y may range from a downstream end of the at least one conditioning module 145 to an upstream end of the weather hood 105. The operational distance may comprise a range of from about 1 meter to about 5.5 meters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. Accordingly, we intend to cover all such modifications, omission, additions and equivalents as may be included within the spirit and scope of the invention as defined by the following claims.

What is claimed is:

1. A system for increasing the efficiency of a turbomachine comprising an inlet system and a compressor, the system comprising:
    a housing configured to channel an airstream towards the inlet system; wherein the housing is positioned upstream of the inlet system, which channels the airstream to the compressor; and
    at least one conditioning module configured for adjusting the temperature of the airstream;
    wherein the airstream enters the conditioning module at a first temperature and exits the conditioning module at a second temperature; and wherein the inlet system is located upstream of the compressor, and forms an input side of the turbomachine.

2. The system of claim 1, wherein the at least one conditioning module comprises at least one of the following systems: a chiller; an evaporative cooler; a spray cooler; or combinations thereof.

3. The system of claim 1 further comprising a bypass for allowing the airstream to flow around the at least one conditioning module; wherein portions of the bypass are positioned within the housing.

4. The system of claim 3, wherein the bypass comprises at least one damper door.

5. The system of claim 4, wherein the at least one damper door is closed when the at least one conditioning module is operating.

6. The system of claim 1, wherein the at least one conditioning module decreases a temperature of the airstream.

7. The system of claim 1, wherein the at least one conditioning module increases a temperature of the airstream.

8. The system of claim 1, wherein the air conditioning system is located at an operational distance that allows for access to the at least one conditioning module.

9. The system of claim 8, wherein the operational distance comprises a range of from about 1 meter to about 3 meters.

10. The system of claim 3, wherein the air conditioning system is located at a bypass distance that reduces a pressure drop between the at least one conditioning module and the inlet system.

11. The system of claim 10, wherein the bypass distance comprises a range of from about 1 meter to about 5.5 meters.

12. A system for adjusting a temperature of an airstream, the system comprising:
    an inlet system comprising:
        an inlet filter house,
        a transition piece, and
        an inlet duct; and
    an air conditioning system comprising:
        a housing configured to channel an airstream towards the inlet system; wherein the housing is positioned upstream of the inlet system, which channels the airstream to the compressor; and
        at least one conditioning module configured for adjusting the temperature of the airstream; wherein the at least one conditioning module comprises at least one of the following system: a chiller, an evaporative cooler; a spray cooler, or combinations thereof;
    wherein the airstream enters the conditioning module at a first temperature and exits the conditioning module at a second temperature; and wherein the inlet system is located upstream of the compressor, and forms an input side of the turbomachine.

13. The system of claim 12 further comprising a bypass, wherein in the bypass allows the airstream to flow around the at least one conditioning module; wherein components of the bypass are positioned within the housing.

14. The system of claim 13, wherein the bypass comprises at least one damper door, wherein the at least one damper door is nearly closed when the at least one conditioning module is operating.

15. The system of claim 12, wherein the at least one conditioning module decreases a temperature of the airstream from the first temperature to the second temperature.

16. The system of claim 12, wherein the at least one conditioning module increases a temperature of the airstream from the first temperature to the second temperature.

17. The system of claim 12, wherein the air conditioning system is located at an operational distance that allows for access to the at least one conditioning module.

18. The system of claim 12, wherein the operational distance comprises a range of from about 1 meter to about 3 meters.

19. The system of claim 13, wherein the air conditioning system is located at a bypass distance, wherein the bypass distance reduces a pressure drop across the at least one conditioning module.

20. The system of claim 13, wherein the bypass distance comprises a range of up to about 5.5 meters.

* * * * *